US012649308B2

(12) United States Patent
Asakura

(10) Patent No.: US 12,649,308 B2
(45) Date of Patent: Jun. 9, 2026

(54) INKJET PRINTER, IMAGE FORMATION METHOD, AND COMPUTER READABLE RECORDING MEDIUM STORING IMAGE FORMATION PROGRAM

(71) Applicant: Konica Minolta, Inc., Tokyo (JP)

(72) Inventor: Shinya Asakura, Tama-ku Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 319 days.

(21) Appl. No.: 18/361,104

(22) Filed: Jul. 28, 2023

(65) Prior Publication Data

US 2024/0075735 A1     Mar. 7, 2024

(30) Foreign Application Priority Data

Sep. 2, 2022     (JP) ................................. 2022-139970

(51) Int. Cl.
*B41J 2/045* (2006.01)
*G06K 15/00* (2006.01)
*G06K 15/02* (2006.01)

(52) U.S. Cl.
CPC ......... *B41J 2/0451* (2013.01); *B41J 2/04586* (2013.01); *G06K 15/002* (2013.01); *G06K 15/027* (2013.01); *G06K 15/408* (2013.01); *G06K 2215/101* (2013.01)

(58) Field of Classification Search
CPC ...... B41J 2/0451; B41J 2/165; B41J 2/16579; B41J 29/393; B41J 2029/3935
See application file for complete search history.

(56) References Cited

U.S. PATENT DOCUMENTS

| | | | | |
|---|---|---|---|---|
| 2004/0046811 | A1* | 3/2004 | D'Souza | B41J 2/04508 347/12 |
| 2007/0085866 | A1* | 4/2007 | Vladislav | B41J 29/393 347/9 |
| 2017/0087910 | A1* | 3/2017 | Nagashima | B41J 2/16585 |
| 2019/0255861 | A1* | 8/2019 | Hauck | B41J 2/2139 |

FOREIGN PATENT DOCUMENTS

| | | |
|---|---|---|
| JP | 5433476 | 3/2014 |

* cited by examiner

*Primary Examiner* — Scott A Richmond
(74) *Attorney, Agent, or Firm* — BakerHostetler

(57) ABSTRACT

An inkjet printer includes a plurality of nozzles and forms an image on a medium with ink ejected from each of the nozzles, and includes: a detector that detects an ejection failure nozzle of the ink from the plurality of nozzles; a test image former that forms on the medium a test image to which an ejection amount of ink from a neighboring nozzle adjacent to the ejection failure nozzle is added as an extra and supplemented; and a job image former that forms on the medium a job image obtained by performing correction of adding as the extra on the ejection amount of the ink from the neighboring nozzle based on the test image formed on the medium.

13 Claims, 10 Drawing Sheets

1, 1'

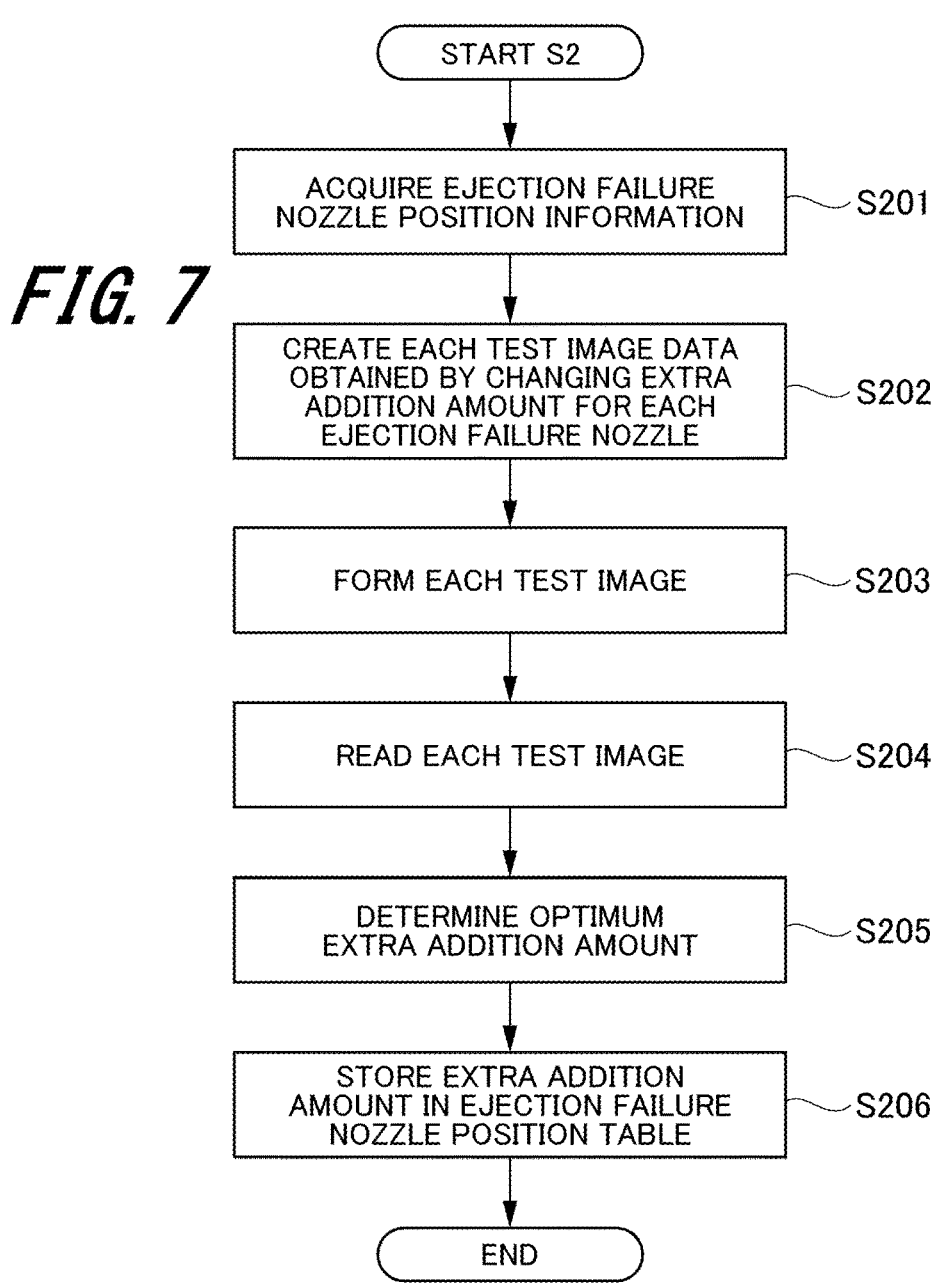

*FIG. 7*

START S2

ACQUIRE EJECTION FAILURE
NOZZLE POSITION INFORMATION — S201

CREATE EACH TEST IMAGE DATA
OBTAINED BY CHANGING EXTRA
ADDITION AMOUNT FOR EACH
EJECTION FAILURE NOZZLE — S202

FORM EACH TEST IMAGE — S203

READ EACH TEST IMAGE — S204

DETERMINE OPTIMUM
EXTRA ADDITION AMOUNT — S205

STORE EXTRA ADDITION
AMOUNT IN EJECTION FAILURE
NOZZLE POSITION TABLE — S206

END

*FIG. 8*

| (1)IMAGE DENSITY | (2)EXTRA ADDITION AMOUNT | | |
|---|---|---|---|
| 10% | 12.5% | 25.0% | 37.5% |
| 20% | 12.5% | 25.0% | 37.5% |
| 25% | 12.5% | 25.0% | 37.5% |
| 50% | 12.5% | 25.0% | 37.5% |

0%, (2b)    12.5%    25%    37.5%

| EJECTION FAILURE NOZZLE POSITION | IMAGE DENSITY | EXTRA ADDITION AMOUNT (DETERMINED) |
|---|---|---|
| (x, y) | 10% | 5.0% |
| | 20% | 12.5% |
| | 25% | 25.0% |
| | 50% | 30.0% |

*1'*

| CONVERSION VALUE |
| --- |
| CYAN : MAGENTA 1 : 2 |
| CYAN : YELLOW 1 : 3 |
| CYAN : BLACK 1 : 0.5 |
| MAGENTA : YELLOW 1 : 1.5 |
| ⋮ |

1

INKJET PRINTER, IMAGE FORMATION METHOD, AND COMPUTER READABLE RECORDING MEDIUM STORING IMAGE FORMATION PROGRAM

CROSS-REFERENCE TO RELATED APPLICATIONS

This application claims priority to Japanese patent Application No. 2022-139970, filed Sep. 2, 2022, the entire disclosure of which is incorporated herein by reference.

BACKGROUND

Technological Field

The present invention relates to an inkjet printer, an image formation method, and a computer readable recording medium storing an image formation program.

Description of the Related Art

An inkjet printer includes a plurality of nozzles that eject inks. During image formation that uses such an inkjet printer, when one of the plurality of nozzles causes an ink misfire failure, correction of adding as an extra an ink ejection amount from nozzles adjacent to an ink misfire failure nozzle is performed on data for image formation.

Regarding this correction of adding as an extra, following Patent Literature 1 describes a configuration where a "pseudo misfire nozzle" configured not to eject ink in a pseudo manner is set to draw a patch, and a correction coefficient is determined based on a result of drawing. The "pseudo misfire nozzle" deals with a difference in an influence of droplet settling interference, and is set from, for example, each specific nozzle belonging to an upstream nozzle row located at an upstream and a downstream nozzle row located at a downstream in a sheet conveyance direction.

RELATED ART LITERATURE

Patent Literature

Patent Literature 1: JP 5433476 B1

SUMMARY

By the way, due to machining accuracy, a plurality of nozzles provided to an inkjet printer have variations in a physical distance between neighboring nozzles, a bending amount at a time of ink ejection, and the like.

However, the above-described technique does not take these variations resulting from machining accuracy into account, and cannot perform highly accurate correction of adding as an extra matching each failure nozzle that actually causes an ejection failure.

It is therefore an object of the present invention to provide an inkjet printer, an image formation method, and a computer readable recording medium storing an image formation program that can perform highly accurate correction of adding as an extra in response to ink misfire failures from individual nozzles.

The present invention for achieving such an object is an inkjet printer that includes a plurality of nozzles and forms an image on a medium with ink ejected from each of the nozzles, and that includes: a detector that detects an ejection failure nozzle of the ink from the plurality of nozzles; a test image former that forms on the medium a test image to which an ejection amount of ink from a neighboring nozzle adjacent to the ejection failure nozzle is added as an extra and supplemented; and a job image former that forms on the medium a job image obtained by performing correction of adding as the extra on the ejection amount of the ink from the neighboring nozzle based on the test image formed on the medium.

According to an embodiment of the present invention, it is possible to provide an inkjet printer, an image formation method, and a computer readable recording medium storing an image formation program that can perform highly accurate correction of adding as an extra in response to ink misfire failures from individual nozzles.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a flowchart illustrating extra addition amount determination processing in a second step of the image formation method according to the first embodiment;

FIG. 8 is a view for describing creation of test image data;

DETAILED DESCRIPTION OF EMBODIMENTS

Figure 1:
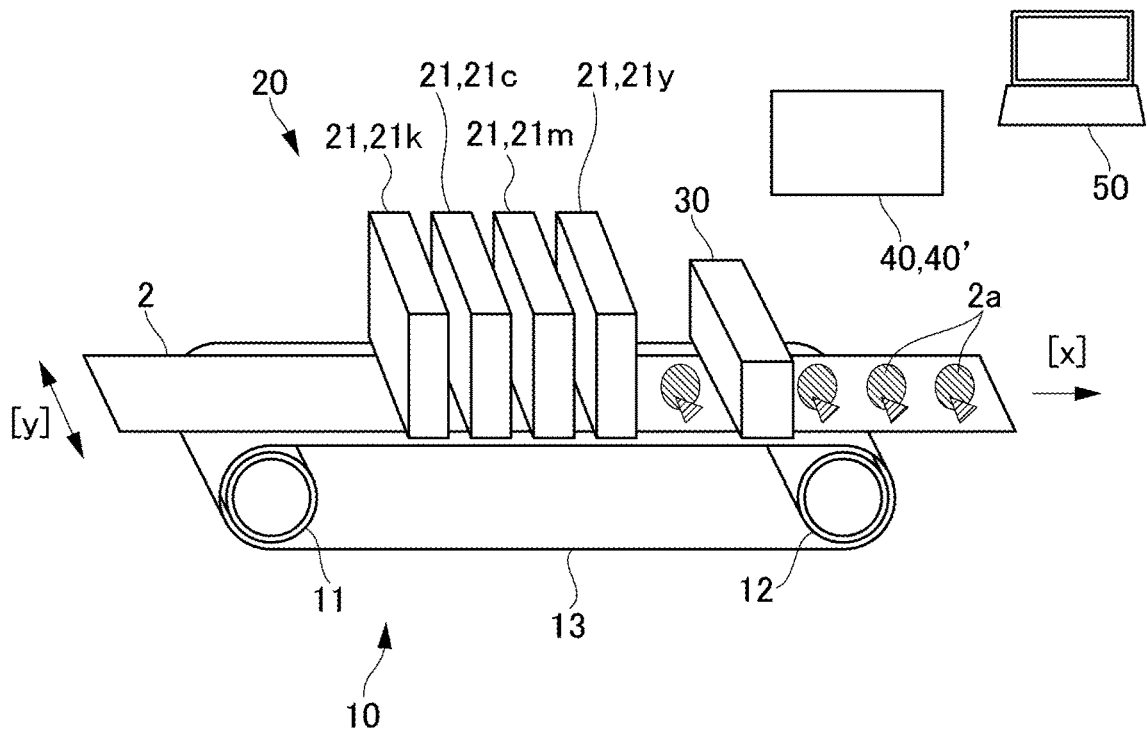
FIG. 1 is a schematic configuration diagram of an inkjet printer according to an embodiment.

Hereinafter, one or more embodiments of the present invention will be described with reference to the drawings. However, the scope of the invention is not limited to the disclosed embodiments.

Hereinafter, embodiments to which the present invention is applied will be described in detail with reference to the drawings. Note that components common to the embodiments will be assigned the same reference numerals, and part of the overlapping description will be omitted.

Inkjet Printer According to First Embodiment

FIG. 1 is a schematic configuration diagram of an inkjet printer 1 according to the embodiment. The inkjet printer 1 illustrated in FIG. 1 is an apparatus for forming an ink image on a principal surface of a recording medium 2. The recording medium 2 is a sheet-like recording medium, and may be a single sheet or continuous sheets. Furthermore, the recording medium 2 is made of various materials such as a fabric material such as a cloth, plain paper, thick paper, thin paper, Japanese paper, special paper, corrugated paper, a resin film, and a building material.

This inkjet printer 1 includes a medium conveyer 10, an ink supplier 20, an image reader 30, a controller 40, and an operation unit 50. Hereinafter, details of these components included in the inkjet printer 1 will be described.

<Medium Conveyer 10>

The medium conveyer 10 is formed by winding an endless belt 13 around a plurality of conveyance rollers 11 and 12. One of the plurality of conveyance rollers 11 and 12 is a driving roller, and causes the endless belt 13 to go around. The belt 13 has an outer circumferential surface having adsorptivity, and holds the sheet-like recording medium 2 at an upper part of the outer circumferential surface. Thus, this medium conveyer 10 is configured to convey the recording medium 2 held by the belt 13 in a conveyance direction [x] that follows the belt 13 that goes around.

<Ink Supplier 20>

The ink supplier 20 includes a plurality of ink heads 21 that eject inks onto the recording medium 2 held by the medium conveyer 10. These ink heads 21 are disposed in a conveyance width direction [y] vertical to the conveyance direction [x] of the recording medium 2, and eject the inks in the conveyance width direction [y] of the recording medium 2.

These ink heads 21 are provided in association with respective ink colors, and are, for example, an ink head 21$k$ for black ink, an ink head 21$c$ for cyan ink, an ink head 21$m$ for magenta ink, and an ink head 21$y$ for yellow ink. The ink heads 21 of the respective colors are aligned in a randomly set color arrangement order along the conveyance direction [x].

Figure 2:
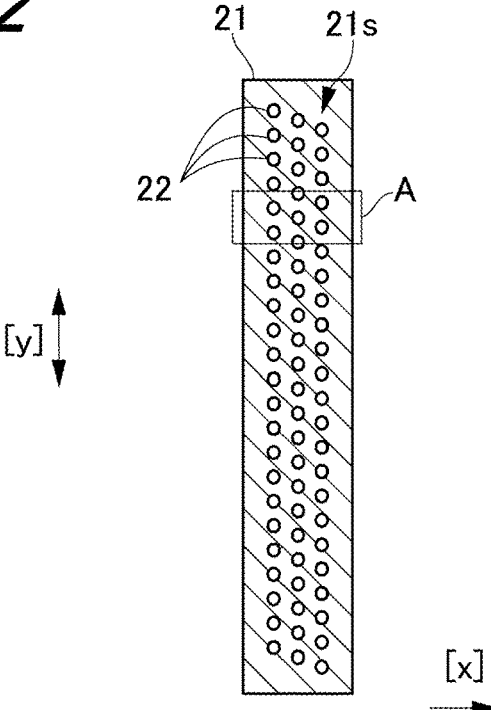
FIG. 2 is a configuration diagram of an ink head of the inkjet printer according to the embodiment.

FIG. 2 is a configuration diagram of the ink head 21 in the inkjet printer according to the embodiment. As illustrated in FIG. 2, each ink head 21 retains a plurality of nozzles 22. The plurality of nozzles 22 have opening portions disposed on a nozzle surface 21$s$ facing the recording medium in the ink head 21, and eject ink from these opening portions toward the recording medium. A plurality of rows (here, three rows) of the respective nozzles 22 are disposed along the conveyance width direction [y] on the nozzle surface 21$s$ of the ink head 21. The nozzles 22 in each row are disposed by being shifted in the conveyance width direction [y] with respect to the other rows of the nozzles 22.

<Image Reader 30>

Returning to FIG. 1, the image reader 30 is disposed on the downstream side in the conveyance direction [x] of the ink supplier 20 so as to face the recording medium 2 to be conveyed by the medium conveyer 10. This image reader 30 is, for example, a line sensor in which imaging elements are linearly aligned over the conveyance width direction [y], and images the surface of the recording medium 2 that has passed through the arrangement part of the ink head 21. Furthermore, the image reader 30 may be formed by two-dimensionally aligning imaging elements. This image reader 30 is an apparatus that can read an image density of the image formed on the recording medium 2 based on an intensity signal of reflected light from the recording medium 2 received by the imaging elements.

<Controller 40>

The controller 40 controls processing of image data input from the external apparatus and driving of each unit of the inkjet printer 1 based on an operation of an operation unit 50 to be described next. This controller 40 is configured as a computer. The computer is hardware used as a so-called computer. The computer includes a Central Processing Unit (CPU) and storage apparatuses such as a Read Only Memory (ROM) and a Random Access Memory (RAM). Furthermore, the computer includes a non-volatile storage and a network interface.

Figure 3:
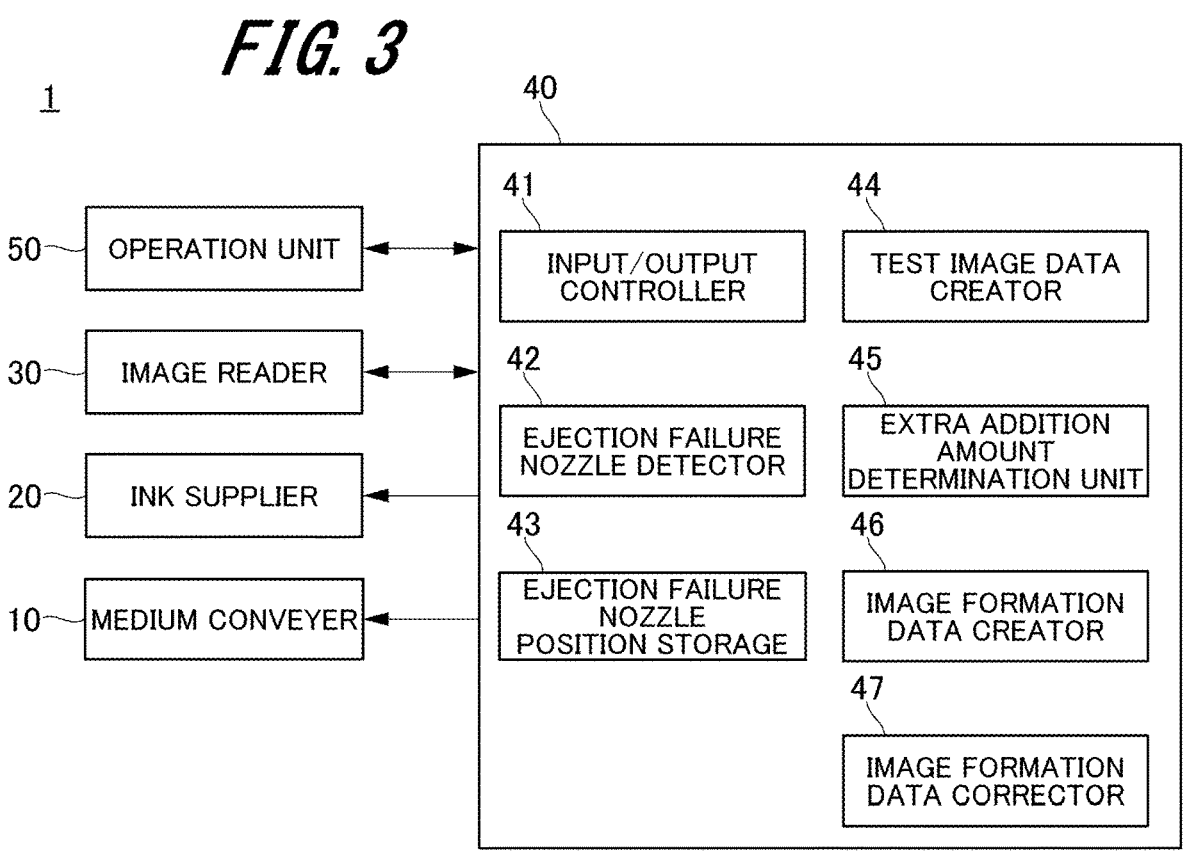
FIG. 3 is a block diagram of the inkjet printer according to a first embodiment.

FIG. 3 is a block diagram of the inkjet printer 1 according to the first embodiment, and is the view for describing the controller 40. As illustrated in FIG. 3, the controller 40 includes an input/output controller 41, an ejection failure nozzle detector 42, an ejection failure nozzle position storage 43, a test image data creator 44, an extra addition amount determiner 45, an image formation data creator 46, and an image formation data corrector 47 as functional components for executing the respective functions. Each of these functional components is an image formation program stored in a recording medium such as the ROM included in the controller 40, or a component that executes the image formation program loaded and stored from the operation unit 50 or another external apparatus to a recording medium such as the RAM or the storage. Each of these functional components will be described below.

[Input/Output Controller 41]

The input/output controller 41 drives the medium conveyer 10 and the ink supplier 20 based on an instruction from the operation unit 50 and data for image formation created by each unit of the controller 40 to perform image formation processing on the recording medium held by the medium conveyer 10. Furthermore, the input/output controller 41 reads the image formed on the recording medium 2 by driving the image reader 30. This input/output controller 41 constitutes part of an image former for forming each image, and a detector for an ejection failure nozzle to be described later.

[Ejection Failure Nozzle Detector 42]

The ejection failure nozzle detector 42 is a component that constitutes part of the detector for the ejection failure nozzle. Based on the chart image read by the image reader 30, the ejection failure nozzle detector 42 detects an ejection failure nozzle that causes a defect of ink misfire in each ink head of the ink supplier 20, and specifies the position of the ejection failure nozzle. A timing and a procedure to specify a position of an ejection failure nozzle by the ejection failure nozzle detector 42 will be described in detail in the following image formation method.

[Ejection Failure Nozzle Position Storage 43]

The ejection failure nozzle position storage 43 stores position information of the ejection failure nozzle specified by the ejection failure nozzle detector 42. Furthermore, the ejection failure nozzle position storage 43 stores the extra addition amount of each ejection failure nozzle determined by the extra addition amount determiner 45 described later in association with the position information of the ejection failure nozzle.

[Test Image Data Creator 44]

The test image data creator 44 is a component that constitutes part of the test image former. The test image data creator 44 creates test image data based on the position information of the ejection failure nozzle stored in the ejection failure nozzle position storage 43. Here, the extra addition amount is an addition amount of ink to be ejected from neighboring nozzles disposed adjacent to the ejection failure nozzle in order to supplement with for an amount of misfired ink from the ejection failure nozzle. The test image data is test image formation data for determining the extra addition amount of ink ejection from neighboring nozzles. A timing and a procedure of creation of the test image data performed by this test image data creator 44 will be described in detail in the following image formation method.

[Extra Addition Amount Determination Unit 45]

The extra addition amount determiner 45 determines an extra addition amount to supplement with for misfired ink from each ejection failure nozzle based on the test image formed on the recording medium 2. The test image is an ink image formed on the recording medium 2 by the inkjet printer 1 based on the test image data created by the test image data creator 44. A timing and a procedure of execution of extra addition amount determination processing performed by this extra addition amount determiner 45 will be described in detail in the following image formation method.

[Image Formation Data Creator 46]

The image formation data creator 46 is a component that constitutes part of a job image former. The image formation data creator 46 creates image formation data obtained by converting data of the job image input from the operation unit 50 for printing and forming an ink image.

[Image Formation Data Corrector 47]

The image formation data corrector 47 is a component that constitutes part of the job image former. The image formation data corrector 47 performs correction of adding as an extra on the image formation data created by the image formation data creator 46 based on the extra addition amount determined by the extra addition amount determiner 45 or the extra addition amount set by the input from the operation unit 50 described below. The data corrected by this image formation data corrector 47 is data for job image formation.

<Operation Unit 50>

Returning to FIG. 1, the operation unit 50 is a component that inputs various instructions and settings related to image formation performed in this inkjet printer 1. The various instructions and settings by the operation unit 50 will be described in the following image formation method. This operation unit 50 may include a display or may be a touch panel provided integrally with the display. Furthermore, this operation unit may be an external apparatus such as a personal computer or a printer controller that can communicate with the controller 40 for data transfer.

Image Formation Method According to First Embodiment

Figure 4:
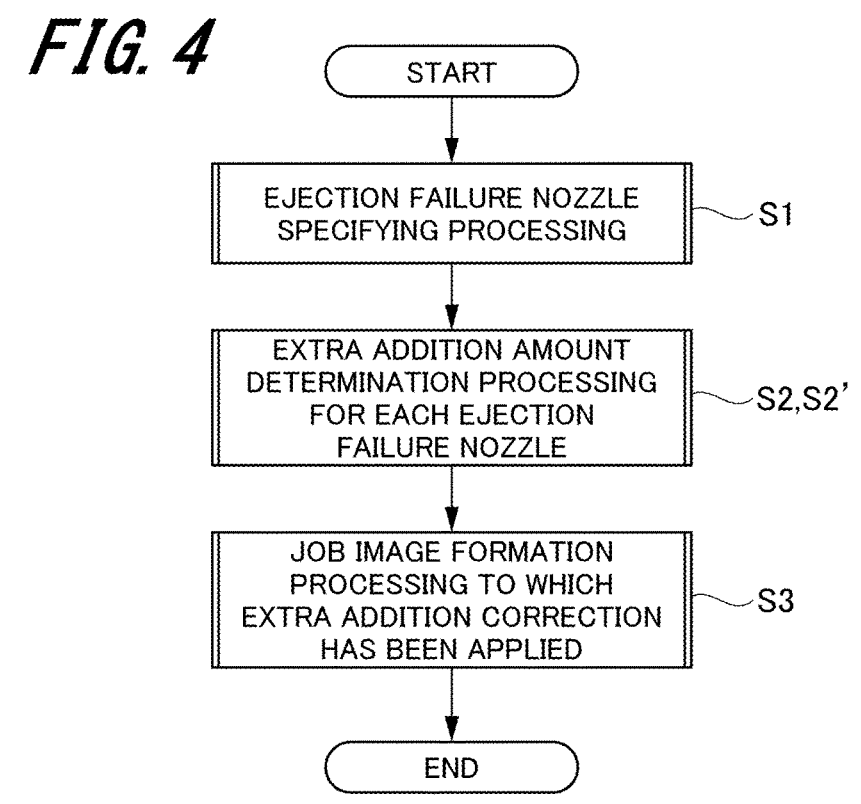
FIG. 4 is a flowchart for describing an image formation method according to the embodiment.

FIG. 4 is a flowchart illustrating the image formation method according to the first embodiment. A procedure illustrated in this flowchart is the image formation method for performing correction of adding as an extra on the ejection failure nozzle that misfires ink during formation of a job image that uses the inkjet printer 1 described above. This image formation method is implemented by each functional component of the above-described controller 40 by executing an image formation program. Hereinafter, the image formation method according to the embodiment will be described in order illustrated in the flowchart of FIG. 4 with reference to FIGS. 1 to 3 and other drawings as necessary.

<First Step S1 (FIG. 4)>

In first step S1, the controller 40 performs processing of specifying an ejection failure nozzle in the inkjet printer 1 according to an instruction from the operation unit 50. This processing is automatically started before formation of the job image when an operator of the inkjet printer 1 instructs formation of the job image from the operation unit 50. Furthermore, the ejection failure nozzle specifying processing may be configured to be started when the operator of the inkjet printer 1 instructs execution of the processing of specifying an ejection failure nozzle according to an input from the operation unit 50.

Figure 5:
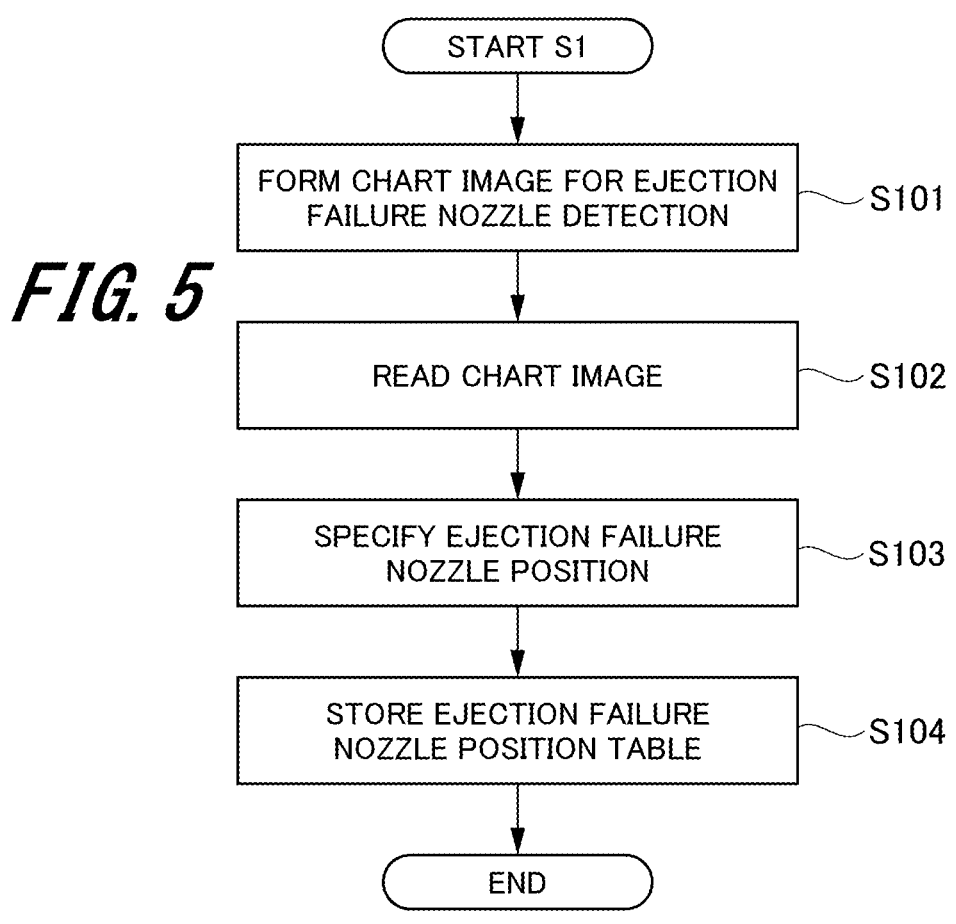
FIG. 5 is a flowchart showing ejection failure nozzle specifying processing in a first step of the image formation method according to the first embodiment.

FIG. 5 is a flowchart for describing the ejection failure nozzle specifying processing in first step S1 of the image formation method of the first embodiment, and illustrates a processing procedure of first step S1 in the flow of FIG. 4. Hereinafter, the ejection failure nozzle specifying processing in first step S1 will be described in order illustrated in the flow of FIG. 5 with reference to FIGS. 1 to 3 and other drawings as necessary.

[Step S101 (FIG. 5)]

In step S101, the input/output controller 41 performs chart image formation for ejection failure nozzle detection. At this time, the input/output controller 41 controls driving of the medium conveyer 10 and the ink supplier 20, and forms a chart image for ejection failure nozzle detection on the recording medium 2. This chart image formation is individually performed per ink head 21.

Figure 6:
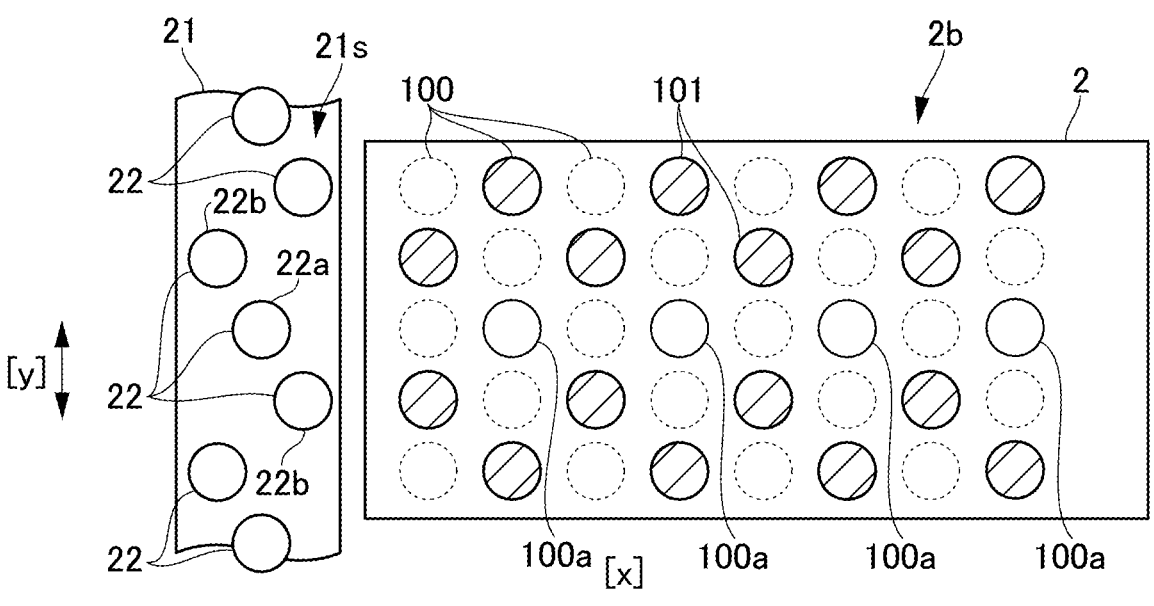
FIG. 6 is a view for describing a chart image for the ejection failure nozzle detection.

FIG. 6 is a view for describing chart image formation for ejection failure nozzle detection. A chart image 2b for ejection failure nozzle detection illustrated in FIG. 6 is formed with ink ejected from each nozzle 22 at a predetermined interval. This chart image 2b is a solid image in which ink dots 101 are aligned at predetermined intervals. In a case where, for example, a settling part of each ink in a case where an ink ejection interval from each nozzle 22 is minimum is a pixel 100, the chart image 2b of the illustrated example is formed as a solid image in which the ink dots 101 are alternately aligned every other pixel in a checkered pattern. Note that the chart image is not limited to this alignment of the ink dots 101.

The input/output controller 41 forms this chart image 2b per ink head 21 by driving the medium conveyer 10 and the ink supplier 20.

[Step S102 (FIG. 5)]

In step S102, the input/output controller 41 causes the image reader 30 to read the chart image formed on the recording medium 2 in step S101.

[Step S103 (FIG. 5)]

In step S103, the ejection failure nozzle detector 42 detects an ejection failure nozzle 22a that causes a defect of ink misfire in each ink head 21 based on the chart image read by the image reader 30, and specifies the position of the ejection failure nozzle. The ejection failure nozzle 22a that has caused the ink misfire failure cannot eject ink, and therefore as illustrated in the chart image 2b of FIG. 6, an ink defective pixel 100a in which the ink dots 101 are missing in the checkered pattern alignment including the ink dots 101 is generated. This ink defective pixel 100a causes white stripes in the chart image 2b.

The ejection failure nozzle detector 42 detects the white stripe of the chart image 2b read by the image reader 30, and specifies the position of the ejection failure nozzle 22a that misfires ink based on the position in the conveyance width direction [y] of the white stripe.

[Step S104 (FIG. 5)]

In step S104, the ejection failure nozzle position storage 43 stores an ejection failure nozzle position table indicating position information of all the ejection failure nozzles 22a specified by the ejection failure nozzle detector 42. Subsequently, the input/output controller 41 ends the ejection failure nozzle specifying processing in first step S1, and then proceeds to second step S2 illustrated in FIG. 4.

<Second Step S2 (FIG. 4)>

In second step S2, the controller 40 performs processing of determining an extra addition amount matching each specified ejection failure nozzle 22a. The extra addition amount determined here is an extra addition amount of ink to be ejected from neighboring nozzles 22b provided adjacent to each ejection failure nozzle 22a in order to supplement with for the ink defective pixel 100a (see FIG. 6) caused by the ink ejection failure of the ejection failure nozzle 22a. Note that the neighboring nozzles 22b are the two nozzles 22 disposed closest to both sides in the conveyance width direction [y] of ejection failure nozzle 22a.

FIG. 7 is a flowchart illustrating the extra addition amount determination processing in the second step of the image formation method according to the first embodiment, and illustrates a processing procedure in second step S2 in the flow of FIG. 4. Hereinafter, the extra addition amount determination processing in second step S2 will be described in order illustrated in the flow of FIG. 7 with reference to FIGS. 1 to 3 and other drawings as necessary.

[Step S201 (FIG. 7)]

In step S201, the test image data creator 44 acquires position information of an ejection failure nozzle from the ejection failure nozzle position storage 43. Here, position information of all the ejection failure nozzles stored in the ejection failure nozzle position table of the ejection failure nozzle position storage 43 is acquired.

[Step S202 (FIG. 7)]

In step S202, the test image data creator 44 creates each test image data obtained by changing the extra addition amount for each ejection failure nozzle. At this time, the test image data creator 44 creates a plurality of items of test image data for test image formation for which the extra addition amount is set stepwise as follows per image density set stepwise for each ejection failure nozzle.

FIG. 8 is a view for describing creation of test image data. (1) The image density illustrated in FIG. 8 is a percentage at which the ink is actually ejected for the regularly aligned pixels 100 (see FIG. 6) to form the ink dots 101. Furthermore, (2) the extra addition amount is an extra addition amount of ink to be ejected from the neighboring nozzles 22b adjacent to both sides of the ejection failure nozzle 22a, and is achieved by increasing the number of nozzles that eject ink or by increasing a droplet amount of ink to be ejected from each nozzle.

As illustrated in FIG. 8, the test image data creator 44 creates a plurality of items of test image data for which (2) the extra addition amount is set stepwise per (1) image density set stepwise for the ejection failure nozzle 22a at each position acquired from the ejection failure nozzle position storage 43. Here, the stepwise settings include the number of levels and a numerical value of each level.

Note that, in FIG. 8, (1) the image density is set to four levels, and (2) the extra addition amount is set to three levels. However, the stepwise settings of (1) the image density and (2) the extra addition amount are not limited to this, and the stepwise settings of (1) the image density and (2) the extra addition amount may be different, and moreover, the stepwise settings of (2) the extra addition amount may be different per (1) image density.

[Step S203 (FIG. 7)]

In step S203, the input/output controller 41 forms a plurality of test images of different extra addition amounts per image density based on the test image data created in step S202.

Figure 9:
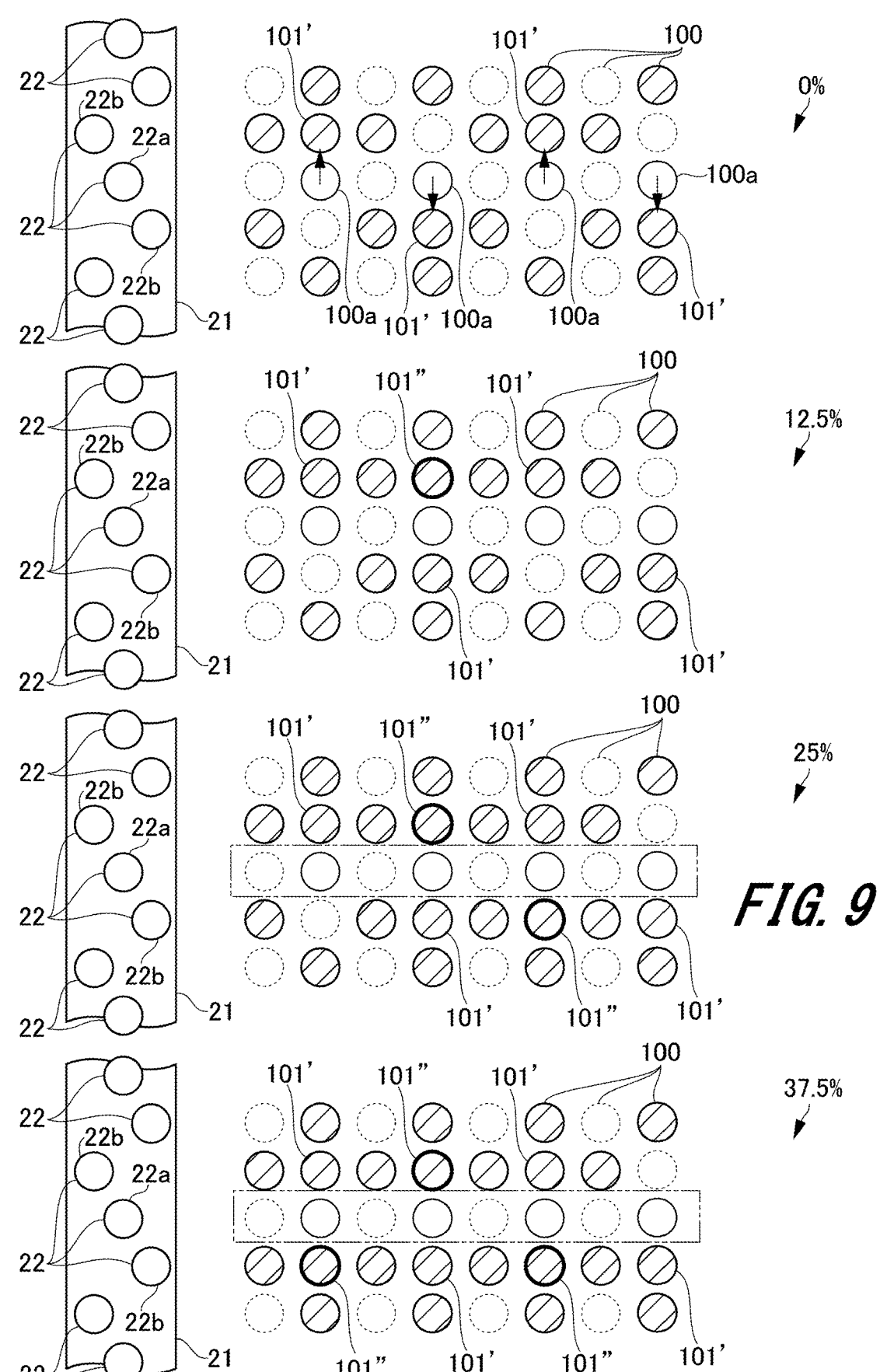
FIG. 9 is a view for describing formation of a test image.

FIG. 9 is a view for describing formation of a test image, and illustrates an example in a case where the image density is 50%. The test image of 0% in extra addition amount is an image formed by moving the ink defective pixels 100a simply caused by the ejection failure nozzle 22a to the blank pixels 100 among the pixels 100 meeting the neighboring nozzles 22b as indicated by arrows in FIG. 9 to form moved ink dots 101'. Note that the test image of 0% in extra addition amount does not necessarily need to be formed.

The test image of 12.5% in extra addition amount is a test image in which additional supplemented ink dot 101" is formed for 12.5% of an originally blank pixel compared to 0% in extra addition amount among the pixels meeting the two neighboring nozzles 22b.

The test image of 25% in extra addition amount is a test image in which the additional supplemented ink dots 101" are formed for 25% of originally blank pixels compared to 0% in extra addition amount among the pixels meeting the two neighboring nozzles 22b.

The test image of 37.5% in extra addition amount is a test image in which the additional supplemented ink dots 101" are formed for 37.5% of originally blank pixels compared to 0% in extra addition amount among the pixels meeting the two neighboring nozzles 22b.

[Step S204 (FIG. 7)]

In step S204, the input/output controller 41 causes the image reader 30 to sequentially read the formed test images.

[Step S205 (FIG. 7)]

In step S205, the extra addition amount determiner 45 determines an optimum extra addition amount per image density set stepwise for each ejection failure nozzle, based on the test image read by the image reader 30.

Figures 10, 11:
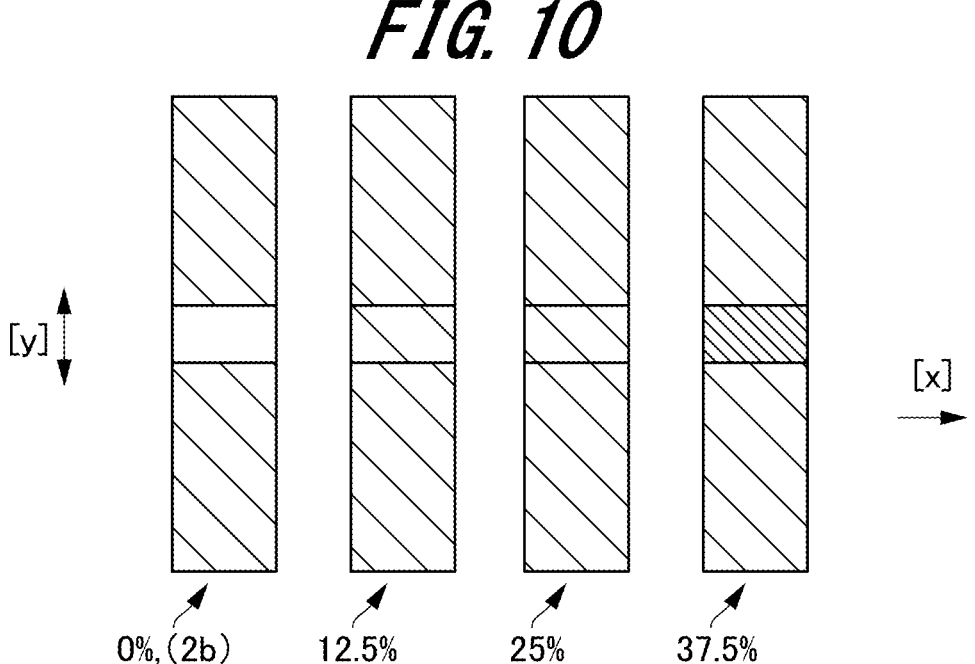
FIG. 10 is a view illustrating a read image obtained by reading the test image.
FIG. 11 is a view illustrating a table to which an extra addition amount is set per ejection failure nozzle.

FIG. 10 is a view illustrating a read image obtained by reading the test image, and the read image corresponds to each test image of each extra addition amount illustrated in FIG. 9. As illustrated in FIG. 10, the extra addition amount determiner 45 extracts the test image having the extra addition amount (e.g., 25%) whose fluctuation of the image density in the conveyance width direction [y] is minimum from the reading result of the test image having each extra addition amount (0%, 12.5%, and . . . ). Furthermore, the extracted extra addition amount of the test image is determined as an optimum extra addition amount. Consequently, the extra addition amount is determined such that fluctuation of an image density of an area including a portion meeting the ejection failure nozzle is minimum and more uniform.

The extra addition amount determiner 45 performs the above-described extra addition amount determination processing on each ejection failure nozzle per image density.

Note that this step S205 is not limited to being performed by the extra addition amount determiner 45 of the controller 40, and may be determined by the operator of the inkjet printer 1 by visually checking a test image formed on the recording medium 2.

In this case, the operator determines the optimum extra addition amount matching each ejection failure nozzle by inputting from the operation unit 50 the extra addition amount matching each ejection failure nozzle. In such a case, step S204 may not be performed. Furthermore, in a case where the operation unit 50 includes a display, the operation unit 50 may be configured to cause the display to display selection screens associated with the respective test images of 0%, 12.5%, 25%, and 37.5%, and cause the operator to select and input one test image. Consequently, there may be employed a configuration where the operator selects and inputs one test image by operating the operation unit 50, and thereby automatically determine the extra addition amount matching the selected test image as the optimum extra addition amount matching each ejection failure nozzle.

Furthermore, the extra addition amount determiner 45 may linearly interpolate for an intermediate density of the stepwise image densities the extra addition amount determined per image density for each ejection failure nozzle, and determine the linearly interpolated extra addition amount as the extra addition amount of each ejection failure nozzle.

[Step S206 (FIG. 7)]

In step S206, the ejection failure nozzle position storage 43 adds and stores in the ejection failure nozzle position table the optimum extra addition amount per image density of each ejection failure nozzle determined in step S205. FIG. 11 is a view illustrating a table in which an extra addition amount is set per ejection failure nozzle. As illustrated in FIG. 11, in the ejection failure nozzle position table held in the ejection failure nozzle position storage 43, the extra addition amount per image density is associated with the position information of each ejection failure nozzle and held.

Note that the table illustrated in FIG. 11 holds an extra addition amount determined for each image density set stepwise for each ejection failure nozzle position. However, as described above, the table in FIG. 11 may hold the information of the extra addition amount linearly interpolated for the intermediate density of the stepwise image densities in the extra addition amount determiner 45.

After the above, the extra addition amount determination processing in second step S2 is ended, and then the flow proceeds to third step S3 illustrated in FIG. 4.

<Third Step S3 (FIG. 4)>

In third step S3, the controller 40 performs processing of forming a job image to which the correction of adding as the extra has been applied. Note that this third step S3 may be configured to be started when the operator of the inkjet printer 1 instructs the job image formation processing according to an input from the operation unit 50.

Figure 12:
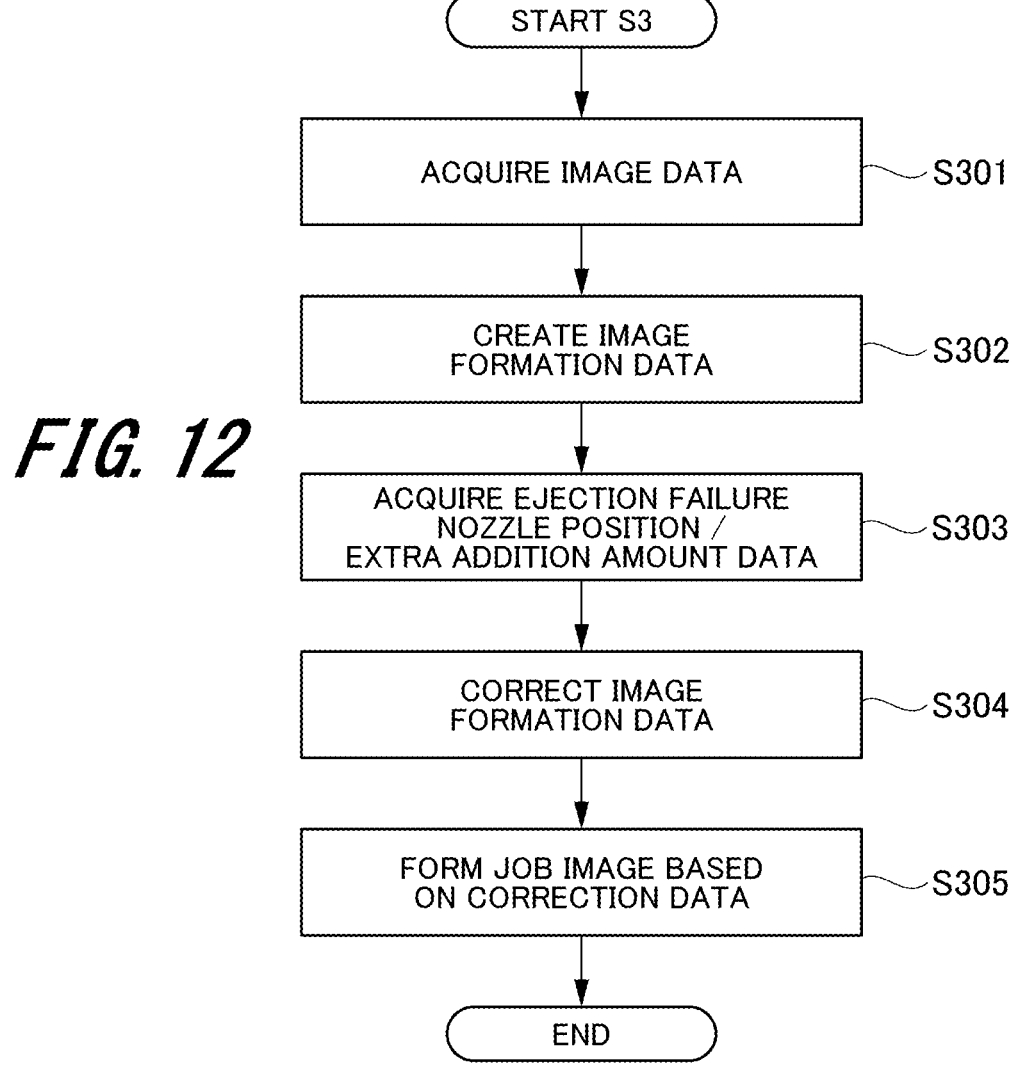
FIG. 12 is a flowchart illustrating job image formation processing in a third step of the image formation method according to the first embodiment.

FIG. 12 is a flowchart illustrating the job image formation processing in the third step of the image formation method according to the first embodiment, and illustrates a processing procedure in third step S3 in the flow of FIG. 4. Hereinafter, the job image formation processing in third step S3 will be described in order illustrated in the flow of FIG. 12 with reference to FIG. 3 and other drawings as necessary.

[Step S301 (FIG. 12)]

In step S301, the image formation data creator 46 acquires image data input from the operation unit 50 or the external apparatus. This image data may be data input from the operation unit 50 or the external apparatus, and held in a storage included in the controller 40.

[Step S302 (FIG. 12)]

In step S302, the image formation data creator 46 performs RIP processing on the acquired image data, and thereby creates image formation data for printing that has been subjected to the RIP processing.

[Step S303 (FIG. 12)]

In step S303, the image formation data corrector 47 acquires data of the optimum extra addition amount per image density at each ejection failure nozzle position held in the ejection failure nozzle position storage 43.

[Step S304 (FIG. 12)]

In step S304, the image formation data corrector 47 corrects the image formation data created in step S302 based on the position information of each ejection failure nozzle and the data of the extra addition amount acquired in step S303.

In this case, the image formation data corrector 47 extracts all image areas including pixels formed by ink ejection from each ejection failure nozzle from the image formation data created by the image formation data creator 46. Furthermore, nearby image densities around a pixel formed by ink ejection from each ejection failure nozzle are found for the extracted image areas.

Next, the image formation data corrector 47 extracts the extra addition amount matching an image density of the level closest to the found image density from the table in which the extra addition amounts have been set. Note that, in a case where the information of the extra addition amount linearly interpolated for the intermediate density of the image densities is held in the table in which the extra addition amounts have been set, the extra addition amount is calculated based on the found image density and the held information.

Subsequently, the image formation data corrector 47 corrects the image formation data by allocating the extracted extra addition amount or the calculated extra addition amount to the neighboring nozzles of the ejection failure nozzle.

[Step S305 (FIG. 12)]

In step S305, the input/output controller 41 controls driving of the medium conveyer 10 and the ink supplier 20 based on the correction data obtained by correcting the image formation data in the image formation data corrector 47, and forms a job image on the recording medium 2. Then, the job image formation processing in the third step is ended.

Furthermore, when the ejection failure nozzle detector 42 newly detects an ink ejection failure nozzle during formation of the job image in step S305, the input/output controller 41 stops the job image formation processing. Furthermore, second step S2 and the subsequent steps in FIG. 4 are performed on the newly detected ejection failure nozzle.

Effects of First Embodiment

As described above, the first embodiment employs a configuration where the extra addition amounts of ink from the neighboring nozzles are determined based on the test image formed by ink ejection from the neighboring nozzles adjacent to the actual ejection failure nozzle. Consequently, it is possible to set the optimum extra addition amount that takes ejection variations caused by nozzle machining accuracy into account. Consequently, it is possible to form a high-quality job image by performing highly accurate correction of adding as an extra matching each ejection failure nozzle.

Inkjet Printer According Second Embodiment

Figures 13, 14:
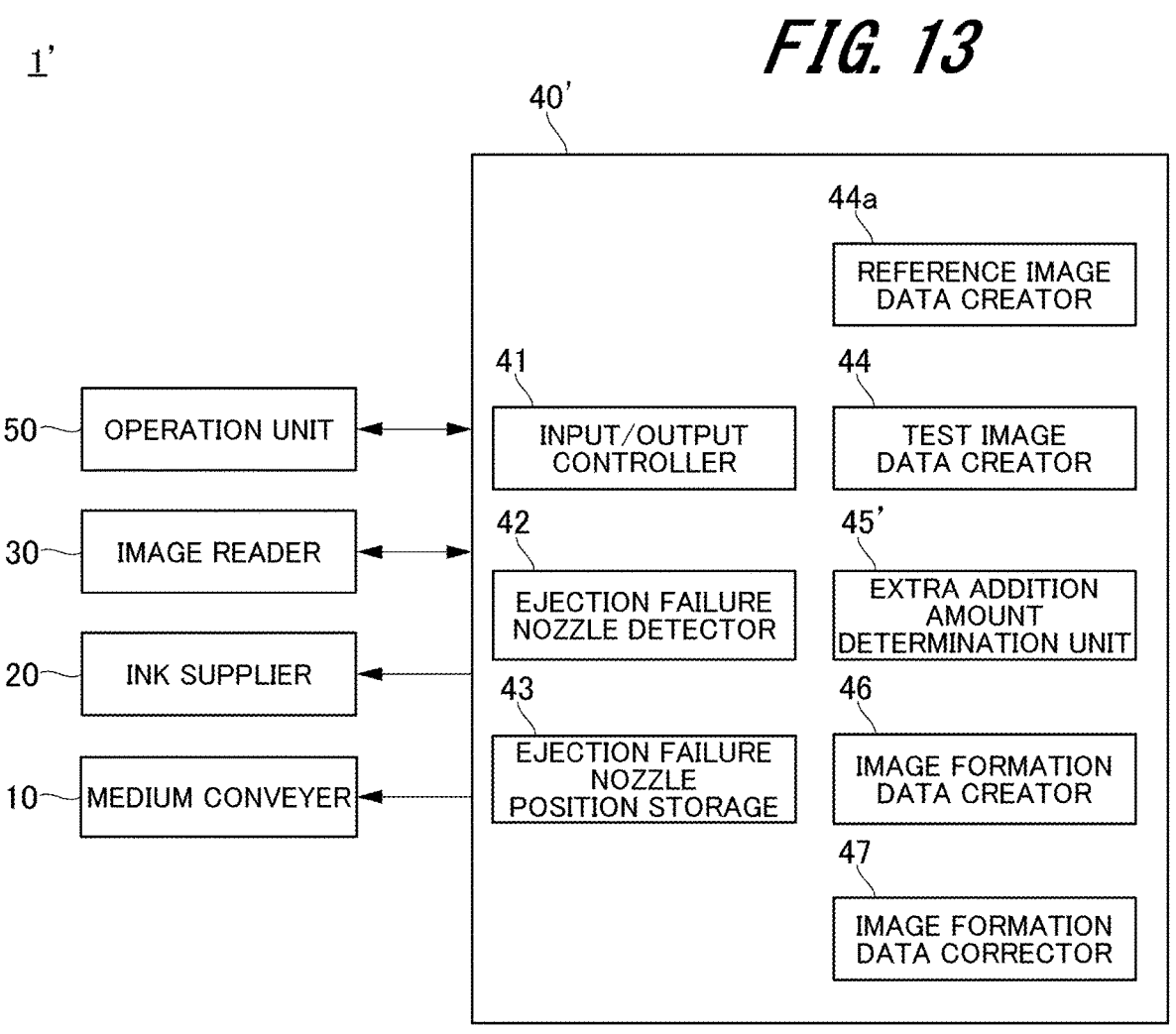
FIG. 13 is a block diagram of an inkjet printer according to a second embodiment.
FIG. 14 illustrates a conversion value table of pixels between ink colors.

FIG. 13 is a block diagram of an inkjet printer 1' according to the second embodiment, and is a view for describing a controller 40'. The inkjet printer 1' illustrated in FIG. 13 differs from an inkjet printer 1 according to the first embodiment described with reference to FIGS. 1 to 3 in a configuration of the controller 40'. In this regard, that the controller 40' is configured as a computer and includes each functional component that executes each function of the image formation program is the same as the first embodiment. Hereinafter, the configuration of the controller 40' will be described with reference to FIGS. 1 and 13 while omitting description of the same components as those of the first embodiment.

<Controller 40'>

As illustrated in FIG. 13, the controller 40' includes an input/output controller 41, an ejection failure nozzle detector 42, an ejection failure nozzle position storage 43, a test image data creator 44, an extra addition amount determiner 45', an image formation data creator 46, and an image formation data corrector 47 as functional components for executing the respective functions. The function executed by the extra addition amount determiner 45' among these components is different from that of the first embodiment. Furthermore, the controller 40' includes a reference image data creator 44a as a new functional component. Hereinafter, the reference image data creator 44a and the extra addition amount determiner 45' will be described.

[Reference Image Data Creator 44a]

The reference image data creator 44a is a component that constitutes part of a reference image former. The reference image data creator 44a creates reference image data based on position information of an ejection failure nozzle stored in the ejection failure nozzle position storage 43. The reference image data is data for reference image formation that is referred to when the extra addition amount determiner 45 determines the extra addition amount based on a test image.

The reference image data creator 44a creates reference image data for forming a reference image obtained by supplementing ink supply from an ejection failure nozzle with ink supply from nozzles of other ink heads 21. The nozzles of the other ink heads are nozzles disposed at same positions in a conveyance width direction [y] as the ejection failure nozzle.

This reference image data creator 44a holds data related to conversion values of pixels having similar image densities of images formed by inks of different colors. FIG. 14 illustrates a pixel conversion value table between ink colors, and illustrates a conversion value table of pixels held by the reference image data creator 44a. As illustrated in FIG. 14, in an example, a case where the conversion value of a pixel of magenta with respect to cyan is two means that the image density of two pixels of magenta is substantially the same as that of one pixel of cyan.

Based on the data of the above-described conversion value, the reference image data creator 44a creates reference image data to which the ink supply amount from the nozzle of the other ink head has been set to achieve the same density as the image density by the ink supply from the ejection failure nozzle. A timing and a procedure of creation of the reference image data performed by this reference image data creator 44a will be described in detail in the following image formation method.

[Extra Addition Amount Determination Unit 45']

The extra addition amount determiner 45' determines an extra addition amount to supplement with for ink misfire from each ejection failure nozzle based on the test image formed on the recording medium 2 and the reference image. The test image is an ink image formed on the recording medium 2 by the inkjet printer 1' based on the test image data created by the test image data creator 44. Furthermore, the reference image is an ink image formed on the recording medium 2 by the inkjet printer 1' based on the reference image data created by the reference image data creator 44a. A timing and a procedure of execution of the extra addition amount determining processing performed by this extra addition amount determiner 45' will be described in detail in the following image formation method.

Image Formation Method According to Second Embodiment

Next, the second embodiment of a method for forming an ink image using the inkjet printer 1' described with reference to FIGS. 1 and 13 will be described. The image formation method according to the second embodiment is implemented when each functional component of the above-described controller 40' executes the image formation program. The image formation method according to the second embodiment differs from the image formation method according to the first embodiment in a procedure in second step S2' illustrated in FIG. 4, and first step S1 and third step S3 are the same as those of the first embodiment. Therefore, in the following description, the same steps as those of the image formation method according to the first embodiment will be assigned the same reference numerals, redundant description will be omitted, and only second step S2' will be described.

Figure 15:
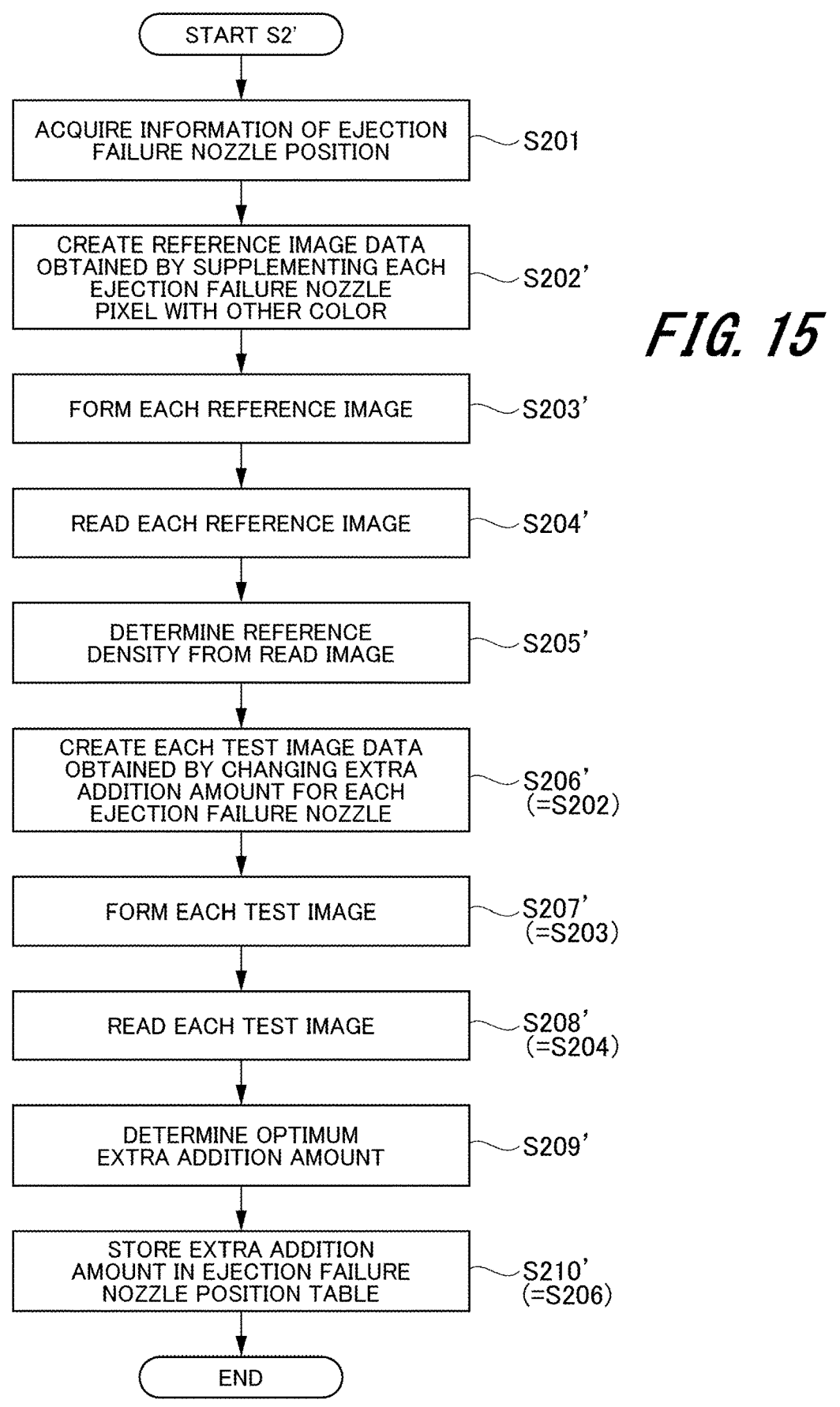
FIG. 15 is a flowchart illustrating extra addition amount determination processing in a second step of the image formation method according to the second embodiment.

FIG. 15 is a flowchart illustrating the extra addition amount determination processing in second step S2' of the image formation method according to the second embodiment, and illustrates the processing procedure in second step S2 in the flow of FIG. 4. Hereinafter, the extra addition amount determination processing in second step S2' will be described in order illustrated in the flow of FIG. 15 with reference to FIG. 13 and other drawings as necessary.

[Step S201 (FIG. 15)]

In step S201, the test image data creator 44 acquires ejection failure nozzle position information from the ejection failure nozzle position storage 43. This procedure is performed according to the same procedure as that of step S201 in the first embodiment.

[Step S202' (FIG. 15)]

In step S202', the reference image data creator 44a creates, as reference image data, image data obtained by supplementing with another color an ink defective pixel meeting each ejection failure nozzle. In this case, the reference image data creator 44a creates reference image data that supplements ink misfire from each ejection failure nozzle with ink supply from the nozzle of the another ink head 21 different from the ink head 21 that retains the ejection failure nozzle among the plurality of ink heads 21 illustrated in FIG. 1.

The reference image data creator 44a creates reference image data obtained by converting pixel values such that an image formed by ink ejection from an ejection failure nozzle and an image formed by ink ejection from a nozzle retained by another ink head have the same density. At this time, the reference image data creator 44a converts the pixel values based on the held pixel conversion value table (FIG. 14), and creates reference image data per image density.

Note that the reference image data is created per image density, and therefore there is a case where pixels cannot be replaced with ink of a single color to achieve the same density as an image formed by ink ejection from an ejection failure nozzle. Therefore, the reference image data creator 44a selects an optimum ink color per image density based on the conversion value table (FIG. 14), and creates reference image data.
[Step S203' (FIG. 15)]

In step S203', the input/output controller 41 forms a reference image based on the reference image data created in step S202'.

Figure 16:
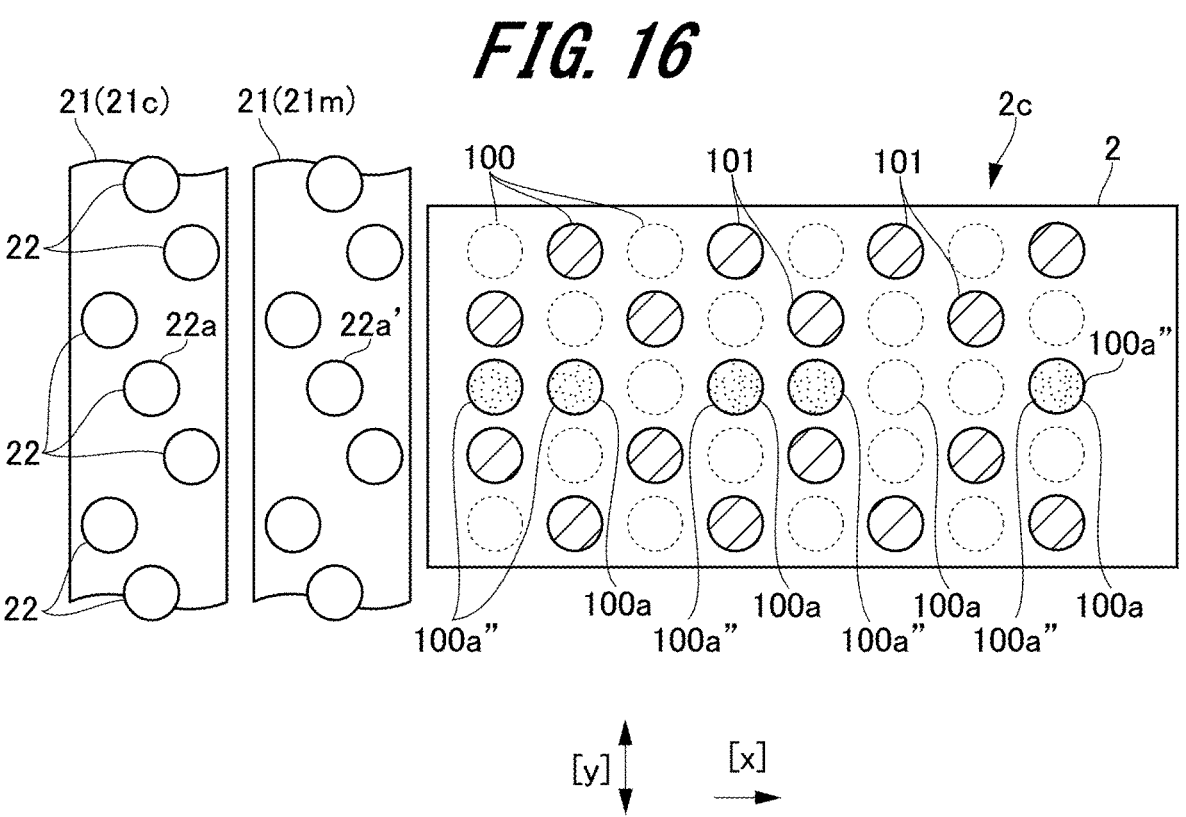
FIG. 16 is a view for describing formation of a reference image.

FIG. 16 is a view for describing formation of a reference image 2c, and is a view illustrating an example of the reference image 2c formed based on the reference image data. When there is an ejection failure nozzle 22a in an ink head 21c for cyan ink as illustrated in FIG. 16, the reference image 2c having additional supplemented ink dots 100a" is formed by ink supply from the another ink head 21 (e.g., an ink head 21m for magenta ink).

At this time, a nozzle 22 disposed at the same position in the conveyance width direction [y] in the other ink head 21m as that of the ejection failure nozzle 22a is a same position nozzle 22a', and this same position nozzle 22a' supplies ink. Furthermore, at this time, the ink supply of the adjusted ink supply amount (supply timing) from the same position nozzle 22a' is performed by converting the pixel value to achieve each image density set to the reference image 2c.
[Step S204' (FIG. 15)]

In step S204', the input/output controller 41 causes an image reader 30 to sequentially read the reference image 2c formed in step S203'.
[Step S205' (FIG. 15)]

In step S205', the extra addition amount determiner 45' determines an image density of the read image read by the image reader 30 in step S204' as a reference density.
[Step S206' (FIG. 15)]

In step S206', the test image data creator 44 creates each test image data of the changed extra addition amount for each ejection failure nozzle. Creation of the test image data described here is performed according to the same procedure as step S202 according to the first embodiment. In this regard, (1) the settings of the image density illustrated in FIG. 8 are the same as settings of the image density of each reference image data created in above-described step S202'.
[Step S207' (FIG. 15)]

In step S207', the input/output controller 41 forms a plurality of test images of different extra addition amounts based on the test image data created in step S206'. Formation of the test image described here is performed according to the same procedure as step S203 according to the first embodiment.
[Step S208' (FIG. 15)]

In step S208', the input/output controller 41 causes the image reader 30 to sequentially read the test image formed in step S207'.
[Step S209' (FIG. 15)]

In step S209', the extra addition amount determiner 45' determines an optimum extra addition amount based on the image density of each test image read by the image reader 30 in step S208' and the reference density determined in step S205'. The extra addition amount determiner 45' determines the optimum extra addition amount per image density.

Figure 17:
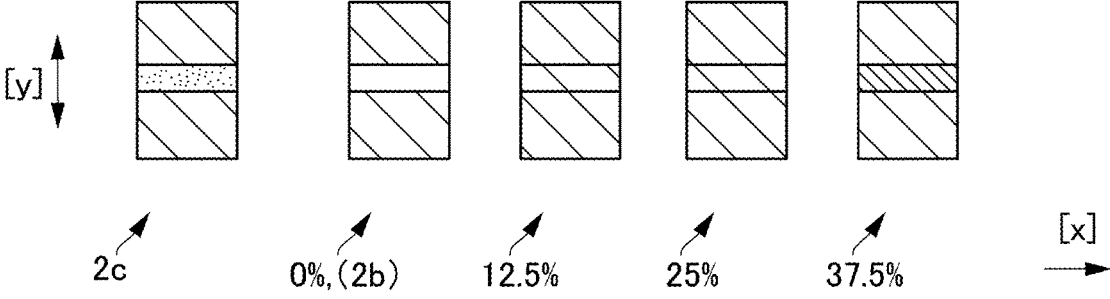
FIG. 17 is a view illustrating a reference image and a read image obtained by reading a test image of each extra addition amount.

FIG. 17 is a view illustrating the reference image 2c and a read image obtained by reading a test image of each extra addition amount. The test image is each test image matching each extra addition amount (0%, 12.5%, and . . . in an example). As illustrated in FIG. 17, the extra addition amount determiner 45' compares a reading result of the test image of each extra addition amount (0%, 12.5%, and . . . ) with the reference density determined by reading the reference image 2c per image density. Then, the extra addition amount determiner 45' extracts a test image having an image density closest to the reference density, and determines an extra addition amount (e.g., 25%) of the extracted test image as an optimal extra addition amount per image density.

The extra addition amount determiner 45' performs the above-described extra addition amount determination processing on each image density of each ejection failure nozzle.

Furthermore, the extra addition amount determiner 45' may linearly interpolate for an intermediate density of stepwise image densities the extra addition amount determined per image density for each ejection failure nozzle, and determine the linearly interpolated extra addition amount as the extra addition amount of each ejection failure nozzle.
[Step S210' (FIG. 15)]

In step S210', the ejection failure nozzle position storage 43 adds and stores in the ejection failure nozzle position table the optimum extra addition amount for each image density of each ejection failure nozzle determined in step S209'. This step S210' is performed according to the same procedure as step S206 in the first embodiment.

After the above, the extra addition amount determination processing in second step S2 is ended, and then the flow proceeds to third step S3 illustrated in FIG. 4. Third step S3 is performed in the same way as that of the procedure described with reference to the flow of FIG. 12 in the first embodiment. In this regard, in a case where the ejection failure nozzle detector 42 newly detects an ink ejection failure nozzle during formation of the job image in step S305, the input/output controller 41 performs second step S2' on the newly detected ejection failure nozzle based on second step S2' and the subsequent steps in FIG. 4 and the flow of FIG. 15.

Effects According to Second Embodiment

The above-described second embodiment employs the configuration where the extra addition amounts of ink from the neighboring nozzles are determined based on the test image formed by ink ejection from the neighboring nozzles adjacent to the actual ejection failure nozzle, so that it is possible to form a high-quality job image by highly accurate correction of adding as an extra matching each ejection failure nozzle similar to the first embodiment.

Furthermore, this configuration determines the extra addition amount by comparing the image densities of the reference image and each test image, so that it is possible to reduce a formation area of the test image compared to the test image created in the first embodiment. That is, the first embodiment employs the configuration where the test image whose fluctuation of image density is minimum and more uniform per each test image is extracted in view of FIG. 10, and therefore requires an area of the test image to such an extent that fluctuation and uniformity of the image density can be confirmed. By contrast with this, the second embodiment employs the configuration where the image densities at portions supplemented with ink are compared between the reference image and each test image in view of FIG. 17. Therefore, the reference image and each test image may include at least an area formed to meet the ejection failure nozzle and the neighboring nozzles. Therefore, the formation areas of these images may be very narrow compared to that of the first embodiment.

Note that the above-described first embodiment and second embodiment employ the configurations where formation of the test image and determination of the extra addition amounts in second steps S2 and S2' are performed before formation of the job image. However, there may be employed the configuration where second steps S2 and S2' may be performed not only at a timing to form the job image, but also every time a predetermined time passes or every time job images are formed a predetermined number of times. In this case, during the job image formation processing in the third step, processing is interrupted in the middle, second steps S2 and S2' are performed, and, in subsequent third step S3, the job image is formed based on the correction data obtained by performing the correction of adding as the extra based on the extra addition amount newly determined in second steps S2 and S2'.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

1, . . . inkjet printer
2 . . . recording medium
2c . . . reference image
21, 21c, 21k, 21m, 21y . . . ink head
22 . . . nozzle
22a . . . ejection failure nozzle
22a' . . . same position nozzle (nozzle retained by another ink head)
22b . . . neighboring nozzle
30 . . . image reader
40, 40' . . . controller
41 . . . input/output controller
42 . . . ejection failure nozzle detector 43 . . . ejection failure nozzle position storage
44 . . . test image data creator (test image former)
44a . . . reference image data creator (reference image former)
45, 45' . . . extra addition amount determination unit
46 . . . image formation data creator (job image former)
47 . . . image formation data corrector (job image former)
50 . . . operation unit
100 . . . pixel
100a . . . ink defective pixel
100a" . . . supplemented ink dot
100b' . . . added ink dot
101 . . . ink dot
101a . . . ink defective pixel

The invention claimed is:

1. An inkjet printer that includes a plurality of nozzles and forms an image on a medium with ink ejected from each of the nozzles, the inkjet printer comprising:
a detector that detects an ejection failure nozzle of the ink from the plurality of nozzles;
a test image former that forms on the medium a test image to which an ejection amount of ink from a neighboring nozzle adjacent to the ejection failure nozzle is added as an extra and supplemented;
a job image former that forms on the medium a job image obtained by performing correction of adding as the extra on the ejection amount of the ink from the neighboring nozzle based on the test image formed on the medium; and
an operation unit for an operator to select one test image from a plurality of the test images having different extra addition amounts of the ink from the neighboring nozzle;

wherein the job image former forms the job image obtained by performing the correction of adding as the extra on the ejection amount of the ink from the neighboring nozzle with the extra addition amount of the test image selected by the operation unit.

2. The inkjet printer according to claim 1, wherein the operation unit enables the operator to set an extra addition amount for the correction of adding as the extra based on the test image formed on the medium, and
wherein the job image former forms the job image obtained by performing the correction of adding as the extra on the ejection amount of the ink from the neighboring nozzle with the extra addition amount set by the operation unit.

3. The inkjet printer according to claim 1, further comprising:
an image reader that reads the test image formed on the medium; and
an extra addition amount determiner that determines an extra addition amount for the correction of adding as the extra based on the test image read by the image reader, wherein
the job image former forms the job image obtained by performing the correction of adding as the extra on the ejection amount of the ink from the neighboring nozzle with the extra addition amount determined by the extra addition amount determiner.

4. The inkjet printer according to claim 3, wherein
the extra addition amount determiner determines the extra addition amount based on the test image read by the image reader such that a fluctuation of an image density of an area including a portion meeting the ejection failure nozzle is minimum.

5. The inkjet printer according to claim 3, wherein
the test image former forms a plurality of the test images having different extra addition amounts of the ink from the neighboring nozzle, and
the extra addition amount determiner determines an extra addition amount of a test image whose fluctuation of an image density is minimum as an extra addition amount for the correction of adding as the extra from among the plurality of test images.

6. The inkjet printer according to claim 3, further comprising:
a plurality of ink heads that retain the plurality of nozzles; and
a reference image former that forms a reference image for the test image on a medium, wherein
each of the ink heads causes the nozzle to eject ink of a different color,
the reference image former forms an image as the reference image, the image being obtained by supplementing the ink from the ejection failure nozzle with ejection from a nozzle retained by a different ink head from the ink head that retains the ejection failure nozzle,
the image reader reads the reference image formed on the medium, and
the extra addition amount determiner determines the extra addition amount for the correction of adding as the extra by comparing the reference image read by the image reader and the test image.

7. The inkjet printer according to claim 6, wherein
the test image former forms a plurality of the test images having different extra addition amounts of the ink from the neighboring nozzle, and
the extra addition amount determiner determines an extra addition amount of a test image having a closest image density image density to an image density of the reference image from among the plurality of test images as an extra addition amount for the correction of adding as the extra.

8. An inkjet printer that includes a plurality of nozzles and forms an image on a medium with ink ejected from each of the nozzles, the inkjet printer comprising:

a detector that detects an ejection failure nozzle of the ink from the plurality of nozzles;

a test image former that forms on the medium a test image to which an ejection amount of ink from a neighboring nozzle adjacent to the ejection failure nozzle is added as an extra and supplemented;

a job image former that forms on the medium a job image obtained by performing correction of adding as the extra on the ejection amount of the ink from the neighboring nozzle based on the test image formed on the medium;

an image reader that reads the test image formed on the medium;

an extra addition amount determiner that determines an extra addition amount for the correction of adding as the extra based on the test image read by the image reader;

a plurality of ink heads that retain the plurality of nozzles; and a reference image former that forms a reference image for the test image on a medium;

wherein the job image former forms the job image obtained by performing the correction of adding as the extra on the ejection amount of the ink from the neighboring nozzle with the extra addition amount determined by the extra addition amount determiner;

wherein each of the ink heads causes the nozzle to eject ink of a different color;

wherein the reference image former forms an image as the reference image, the image being obtained by supplementing the ink from the ejection failure nozzle with ejection from a nozzle retained by a different ink head from the ink head that retains the ejection failure nozzle;

wherein the image reader reads the reference image formed on the medium;

wherein the extra addition amount determiner determines the extra addition amount for the correction of adding as the extra by comparing the reference image read by the image reader and the test image;

wherein the reference image former selects a color of ink to be used for the supplement according to an image density; and wherein forms the reference image by supplement from a nozzle that ejects the ink of the selected color.

9. An inkjet printer that includes a plurality of nozzles and forms an image on a medium with ink ejected from each of the nozzles, the inkjet printer comprising:

a detector that detects an ejection failure nozzle of the ink from the plurality of nozzles;

a test image former that forms on the medium a test image to which an ejection amount of ink from a neighboring nozzle adjacent to the ejection failure nozzle is added as an extra and supplemented;

a job image former that forms on the medium a job image obtained by performing correction of adding as the extra on the ejection amount of the ink from the neighboring nozzle based on the test image formed on the medium;

an image reader that reads the test image formed on the medium;

an extra addition amount determiner that determines an extra addition amount for the correction of adding as the extra based on the test image read by the image reader;

a plurality of ink heads that retain the plurality of nozzles; and a reference image former that forms a reference image for the test image on a medium;

wherein the job image former forms the job image obtained by performing the correction of adding as the extra on the ejection amount of the ink from the neighboring nozzle with the extra addition amount determined by the extra addition amount determiner;

wherein each of the ink heads causes the nozzle to eject ink of a different color;

wherein the reference image former forms an image as the reference image, the image being obtained by supplementing the ink from the ejection failure nozzle with ejection from a nozzle retained by a different ink head from the ink head that retains the ejection failure nozzle;

wherein the image reader reads the reference image formed on the medium;

wherein the extra addition amount determiner determines the extra addition amount for the correction of adding as the extra by comparing the reference image read by the image reader and the test image; and wherein the reference image former holds a conversion value of a pixel having a substantially same image density as an image density of an image formed using ink of a different color, and, when the detector detects the ejection failure nozzle, forms the reference image by converting a pixel value based on the held conversion value such that an image formed by ejection of the ink from the ejection failure nozzle and an image formed by the ejection of ink from the nozzle retained at the different ink head have a same density between colors of different inks.

10. The inkjet printer according to claim 1, wherein the test image former forms a plurality of test images for different image densities, and the extra addition amount determiner determines the extra addition amount for the correction of adding as the extra per image density.

11. The inkjet printer according to claim 1, wherein the test image former forms the test image per predetermined time or every time job images are formed a predetermined number of times, and the job image former performs the correction of adding as the extra every time the test image former forms the test image.

12. An inkjet printer that includes a plurality of nozzles and forms an image on a medium with ink ejected from each of the nozzles, the inkjet printer comprising:

a detector that detects an ejection failure nozzle of the ink from the plurality of nozzles;

a test image former that forms on the medium a test image to which an ejection amount of ink from a neighboring nozzle adjacent to the ejection failure nozzle is added as an extra and supplemented;

a plurality of ink heads that retain the plurality of nozzles;

a reference image former that forms a reference image for the test image on a medium;

an image reader that reads the test image formed on the medium;

an extra addition amount determiner that determines an extra addition amount for the correction of adding as the extra based on the test image read by the image reader; and a job image former that forms on the medium a job image obtained by performing correction of adding as the extra on the ejection amount of the ink from the neighboring nozzle based on the test image formed on the medium;

wherein the reference image former forms the reference image by converting a pixel value such that an image formed by ejection of the ink from the ejection failure nozzle and an image formed by the ejection of ink from the nozzle retained at the different ink head have a same density between colors of different inks;

wherein the job image former forms the job image obtained by performing the correction of adding as the extra on the ejection amount of the ink from the neighboring nozzle with the extra addition amount determined by the extra addition amount determiner;

wherein the image reader is an apparatus that can read an image density;

wherein the extra addition amount determiner uses information of the image density read by the image reader when determining the extra addition amount;

wherein each of the ink heads causes the nozzle to eject ink of a different color;

wherein the reference image former forms an image as the reference image, the image being obtained by supplementing the ink from the ejection failure nozzle with ejection from a nozzle retained by a different ink head from the ink head that retains the ejection failure nozzle;

wherein the image reader reads the reference image formed on the medium, and wherein the extra addition amount determiner determines the extra addition amount for the correction of adding as the extra by comparing the reference image read by the image reader and the test image.

13. An inkjet printer that includes a plurality of nozzles and forms an image on a medium with ink ejected from each of the nozzles, the inkjet printer comprising:

a detector that detects an ejection failure nozzle of the ink from the plurality of nozzles;

a test image former that forms on the medium a test image to which an ejection amount of ink from a neighboring nozzle adjacent to the ejection failure nozzle is added as an extra and supplemented; and a job image former that forms on the medium a job image obtained by performing correction of adding as the extra on the ejection amount of the ink from the neighboring nozzle based on the test image formed on the medium;

wherein the test image former forms a plurality of test images for different image densities; and wherein the extra addition amount determiner determines the extra addition amount for the correction of adding as the extra per image density;

wherein the extra addition amount determiner determines an extra addition amount for an intermediate image density of the image densities by linear interpolation based on the extra addition amount determined per image density;

wherein the extra addition amount determiner determines an extra addition amount for each ejection failure nozzle.

* * * * *